F. YANK.
LAWN MOWER.
APPLICATION FILED OCT. 11, 1912.

1,192,970.

Patented Aug. 1, 1916.
2 SHEETS—SHEET 1.

Inventor
Fred Yank.

Witnesses
F. C. Gibson

By Victor J. Evans
Attorney

F. YANK.
LAWN MOWER.
APPLICATION FILED OCT. 11, 1912.

1,192,970.

Patented Aug. 1, 1916.
2 SHEETS—SHEET 2.

Inventor
Fred Yank.

Witnesses

By Victor J. Evans
Attorney

UNITED STATES PATENT OFFICE.

FRED YANK, OF SEATTLE, WASHINGTON.

LAWN-MOWER.

1,192,970.  Specification of Letters Patent.  Patented Aug. 1, 1916.

Application filed October 11, 1912. Serial No. 725,224.

*To all whom it may concern:*

Be it known that I, FRED YANK, a citizen of the United States, residing at Seattle, in the county of King and State of Washington, have invented new and useful Improvements in Lawn-Mowers, of which the following is a specification.

This invention relates to lawn mowers, and it has for its object to produce a device of this class which will possess superior advantages in point of simplicity, durability and general efficiency.

One object of the invention is to simplify and improve the construction and operation of the motion transmitting means, whereby power is transmitted from the ground wheels to the rotary cutter.

A further object of the invention is to produce a frame structure including simple and convenient casings whereby the transmission gear will be protected, producing in its entirety a simple, light and neatly appearing mower which is easily operated, of light draft and effective in operation.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

Figure 1:
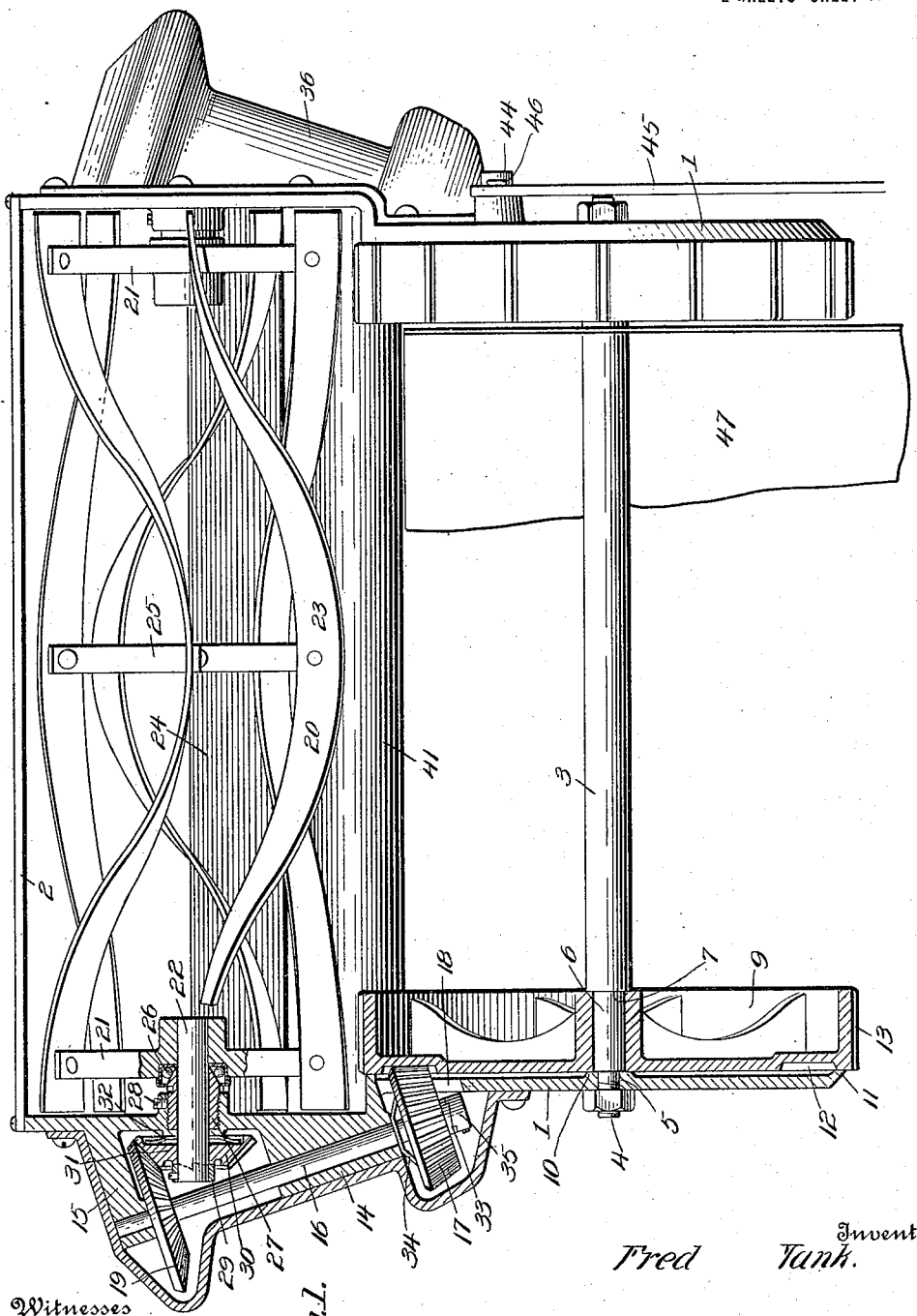
Figure 2:
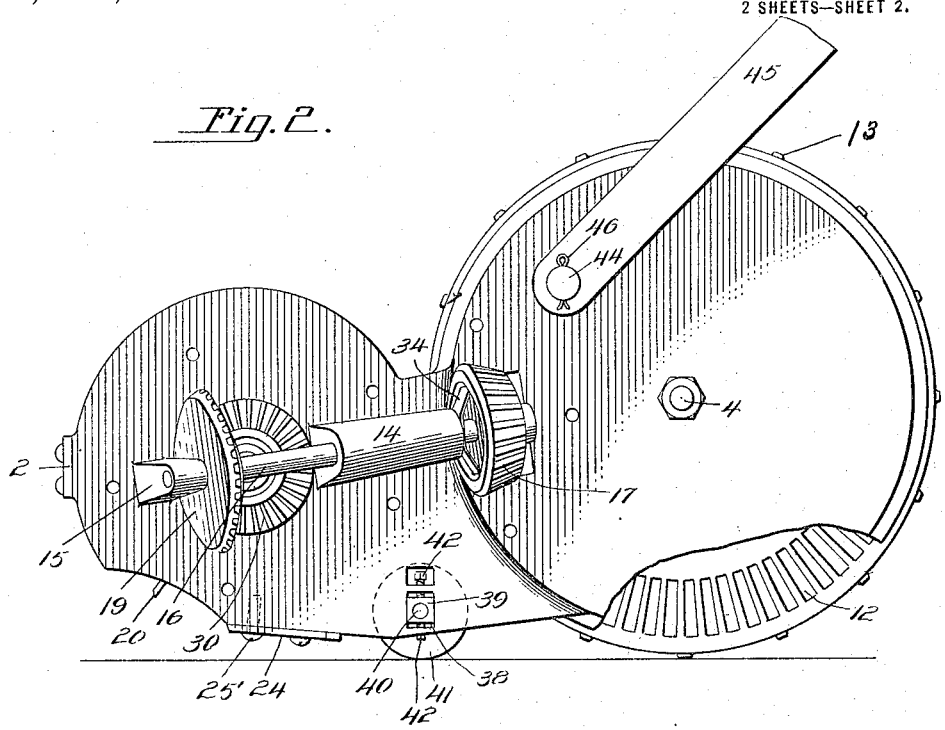
Figure 3:
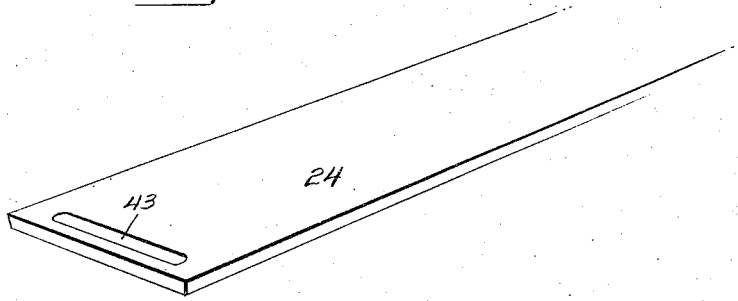

In the drawings,—Figure 1 is a top plan view, partly in section, of the improved lawn mower. Fig. 2 is a side elevation, the near gear casing having been removed. Fig. 3 is a perspective detail view showing one end of the stationary cutter blade detached.

Corresponding parts in the several figures are denoted by like characters of reference.

The frame of the improved lawn mower includes side members or check pieces 1, 1 which are connected together at their front ends by a cross bar 2. The side members 1 are also connected together and spaced apart by the shaft or axle 3 which is provided with threaded extensions 4 projecting through apertures 5 in the side members and with spindles 6 having shoulders 7 that abut upon the inner faces of the side members, which latter are secured on the threaded projecting portions 4 by means of nuts 8. The ground wheels 9 are mounted for rotation on the journals 6. The hub of each ground wheel abuts on a boss 10 on the inner face of the proximate side member. Each of the side members 1 is also provided with a flared annular flange 11 engaging the rim of the proximate ground wheel and providing a deflecting member. When properly proportioned, the parts, when assembled, will be so related that the ground wheels will turn freely on their journals 6, while the rims of said ground wheels will contact so closely with the annular flanges 11 of the frame as to enable the said flanges to deflect obstructions and exclude the same from the spaces between the side members of the casing and the proximate faces of the ground wheels.

The outer face of each ground wheel, that is to say, the face opposed to the proximate side member 1, is provided with an annular gear 12. The rim of each ground wheel is also provided with ground engaging lugs or grouts 13. Each of the side members 1 of the frame is provided with laterally extending lugs 14, 15 affording bearings for a shaft 16 which is inclined forwardly and outwardly with respect to the frame member with which it is associated. Each shaft 16 carries at its rear end a bevel gear 17 that engages the gear 12 of the proximate ground wheel through a slot 18 in the side member 1. Each shaft 16 also carries at its forward end a bevel gear 19 for the purpose of driving the rotary cutter, as will be presently described.

The rotary cutter is composed of a plurality of knives or blades 20 which are terminally mounted on the radiating arms or spiders 21, mounted on stub shafts 22. The blades 20 are curved intermediate their ends to produce centrally disposed bows or arches 23 which, on the downgoing side, are curved in a forward direction, so that the concave of the curve will face the cutting edge of the stationary cutter 24 which is secured adjustably by means of screws 25' on the under faces of the side members of the frame. Owing to this construction, it follows that when the machine is in operation, the knives or cutters will have a tendency to sweep the cut grass in the direction of the medial line of the machine and to discharge it in a bunch, rather than in a scattering fashion, as is usually the case. This special construction of the blades of the rotary cutter, and the advantages resulting therefrom, is one of the advantageous features of the present invention. The blades 20 may be reinforced by means of a spider 25 disposed midway between the spiders 21 and upon the arms of which the curved portions of the blades are suitably secured. It will be observed that the construction herein described avoids a shaft extending axially of the rotary cutter, the appearance of which would more or less obstruct the delivery of the cut grass in a bunched condition at the medial portion of the machine, as described. A spider arranged as seen at 25 presents so slight an obstruction that its presence is not considered objectionable, while the structure of the rotary cutter is considerably reinforced thereby.

The spiders 21 are provided with ball bearings 26 engaging anti-friction cones 27 which are threaded into the side members of the casing, where they are adjustably secured by set screws 28. The stub axles 22 extend through the friction cones, and each axle is equipped with a clutch collar 29 engaging a corresponding clutch member 30 on a bevel gear 31 which is loosely mounted on the axle 22 and is forced in the direction of the clutch member 29 by the action of a suitable spring 32. The gear wheel 31 is in mesh with the gear wheel 19 on the shaft 16. By the presence of the clutch including the members 29, 30 the rotary cutter will be enabled to rotate in a forward direction, while the transmission shafts 16 at the two sides of the machine are stationary. The bevel gears 17 previously referred to are likewise loose and slidable on the shafts 16 and are equipped with clutch members 33, being forced by the springs 34 in the direction of the clutch collars 35 on the shafts, whereby the shafts 16 will remain idle while the ground wheels are reversely rotated.

Each of the side members 1 carries a suitable casing 36 suitably secured thereon by means of screws, said casing surrounding the shafts 16 and the transmission gear, and entirely excluding dirt and obstructions from the working parts of the machine.

The side members of the frame are provided with slots 38 for the reception of vertically movable boxes or bearings 39, wherein the journals 40 of the roller 41 are supported, said journals being vertically adjustable by means of set screws 42.

The cutter 24 is provided at each end thereof with a slot 43 for the passage of the fastening screws 25', thus enabling the cutter to be adjusted with respect to the blades of the rotary cutter. Each of the side members of the frame has an outwardly extending stud 44 with which a handle strap 45 may be suitably connected by means such as a cotter pin 46.

From the foregoing description, taken in connection with the drawings hereto annexed, the operation and advantages of this invention will be readily understood. The construction is of such a nature that light and positive draft will be assured. The ground wheels through the deflecting action of the flared flanges 11 are not liable to become entangled with grass or weeds, and the transmission gearing is likewise protected from dirt and obstructions. The rotary cutter is mounted on ball bearings, insuring a light draft, and it is mounted in such a manner as not to obstruct the delivery of grass toward the medial line of the machine. A receptacle for cut grass, a portion of which is shown at 47 in Fig. 1, may be conveniently supported upon the shaft or axle 3 with its forward portion directly above the roller 41 on which it may be lightly supported. When such receptacle is used, the cut grass will be thrown directly into the same by the action of the curved blades constructed and arranged as shown. The general construction of the device is simple and thoroughly efficient for the purposes for which it is provided.

Having thus described the invention, what is claimed as new, is:—

The combination with a lawn mower having a rotary cutter, of spaced ground wheels each provided with a rim and having on its outer face circumferentially arranged teeth in spaced relation with the rim on the wheel, side members arranged exteriorly of the outer faces of the ground wheels and covering said teeth, means for operating the rotary cutter including shafts carried by the side members and provided with spring pressed gears mounted to slide and mesh with the circumferentially arranged teeth upon the ground wheels, and inwardly extending annular flanges on the side members contacting with the outer faces of the rims on the ground wheels, said flanges being flared toward the rims and serving as deflectors to prevent obstructions passing between the inner edges of the flanges and the outer faces on the ground wheels and clogging the teeth on the ground wheels and gears.

In testimony whereof I affix my signature in presence of two witnesses.

FRED YANK.

Witnesses:
 ELIAS A. WRIGHT,
 RUTH LUNDGREN.

Copies of this patent may be obtained for five cents each, by addressing the "Commissioner of Patents, Washington, D. C."